United States Patent [19]

Carpenter

[11] 4,056,470
[45] Nov. 1, 1977

[54] AUTOMATIC CHLORINATOR

[75] Inventor: Anthony P. Carpenter, Sauquoit, N.Y.

[73] Assignee: Mohawk Video Systems Corporation, Utica, N.Y.

[21] Appl. No.: 716,465

[22] Filed: Aug. 23, 1976

[51] Int. Cl.² .................... E04H 3/16; B01D 11/02
[52] U.S. Cl. .................... 210/94; 23/267 E; 23/253 A; 23/272.7; 210/169; 210/62; 222/52; 222/70
[58] Field of Search .................. 210/169, 61, 62, 22, 210/94, 95; 23/267 E, 272.7, 272.8, 267 R, 253 A; 222/52, 70; 137/268, 467.5

[56] References Cited

U.S. PATENT DOCUMENTS

| | | | |
|---|---|---|---|
| 1,746,525 | 2/1930 | Darrah | 23/267 R |
| 2,405,479 | 8/1946 | Whitlock | 210/96 |
| 2,435,366 | 2/1948 | Riche | 210/96 |
| 2,904,062 | 9/1959 | Techler | 23/267 E |
| 3,464,555 | 9/1969 | Schneider | 210/96 |
| 3,528,545 | 9/1970 | Frazel | 210/96 |
| 3,605,775 | 9/1971 | Zaander | 210/96 |
| 3,763,878 | 10/1973 | Harden | 210/169 |
| 3,804,253 | 4/1974 | Wellman | 210/169 |
| 3,846,078 | 11/1974 | Brett | 210/169 |

Primary Examiner—Stephen J. Emery
Attorney, Agent, or Firm—Bruns & Jenney

[57] ABSTRACT

An automatic chlorinator for a swimming pool having a water circulating system. The chlorinator automatically draws a sample of pool water at regular intervals and compares the level of the residual chlorine in the sample with a predetermined desired level. If the residual chlorine in the sample is below the desired comparison level, the chlorinator automatically adds a measured amount of a chlorine saturated water solution to the pool.

5 Claims, 15 Drawing Figures

AUTOMATIC CHLORINATOR

BACKGROUND OF THE INVENTION

This invention relates generally to liquid purification, and has particular reference to a novel automatic chlorinator for swimming pools having water circulating systems.

As is well known, swimming pools require the regular addition of water soluble bacteria killing agents for safety, chlorine or compounds thereof being the agents most widely used for this purpose. Ideally, the pool water should have a residual chlorine level of from about 0.4 to about 0.6 parts per million. This level is difficult to maintain, however, because the chlorine concentration in the water is affected by many factors, the temperature, the amount of sunlight or rain and the number of bathers among them.

In many home pools, the chlorine is added manually and the residual level is tested at irregular intervals using small, manually operated test kits. This can result in a wide variation in the chlorine concentration from too little which may be unsafe to too much which may be safe but unpleasant. A number of automatic chlorinators have been developed but most of these are for municipal water systems and are too complex and expensive for home use.

An automatic chlorinator particularly designed for home pool use is disclosed in U.S. Pat. No. 3,466,450 granted Sept. 9, 1969 W. L. Goodman. This patent, which is the closest prior art known to the applicant, provides apparatus that periodically pumps a specified volume of pool water into a test chamber were a reagent is added. The reagent changes the color of the water in proportion to the amount of chlorine present. The mixture is optically tested for color and then electrically compared to a standard volume of chlorine concentration after which chlorine is added to the pool if the sample shows less chlorine concentration than the standard.

SUMMARY OF THE INVENTION

The present invention contemplates an automatic chlorinator that is similar in some respects to that of the Goodman patent but has, it is believed, a number of additional advantages. Chief among these are a more accurate water sample testing meams and improved electronic controls for carrying out the operation of same.

Briefly stated, the automatic chlorinator to be disclosed herein includes a novel dual chambered sample vial having a single light source therein. Pool water is drawn into the two chambers at intervals under the control of a clock. A metered amount of reagent is added to and thoroughly mixed with the water in one chamber.

A photocell is provided for each chamber and light rays from the light source pass through the contents of each chamber and onto its photocell. The light rays passing through the chamber without the reagent also passes through a spectral filter. The output signals of the two photocells are compared by a control circuit and, if the residual chlorine in the sample is below the desired level, the circuit operates to add a chlorine saturated solution to the pool from a reservoir that either forms a part of the chlorinator or is a separate unit.

DESCRIPTION OF THE PREFERRED EMBODIMENT

Figure 1:
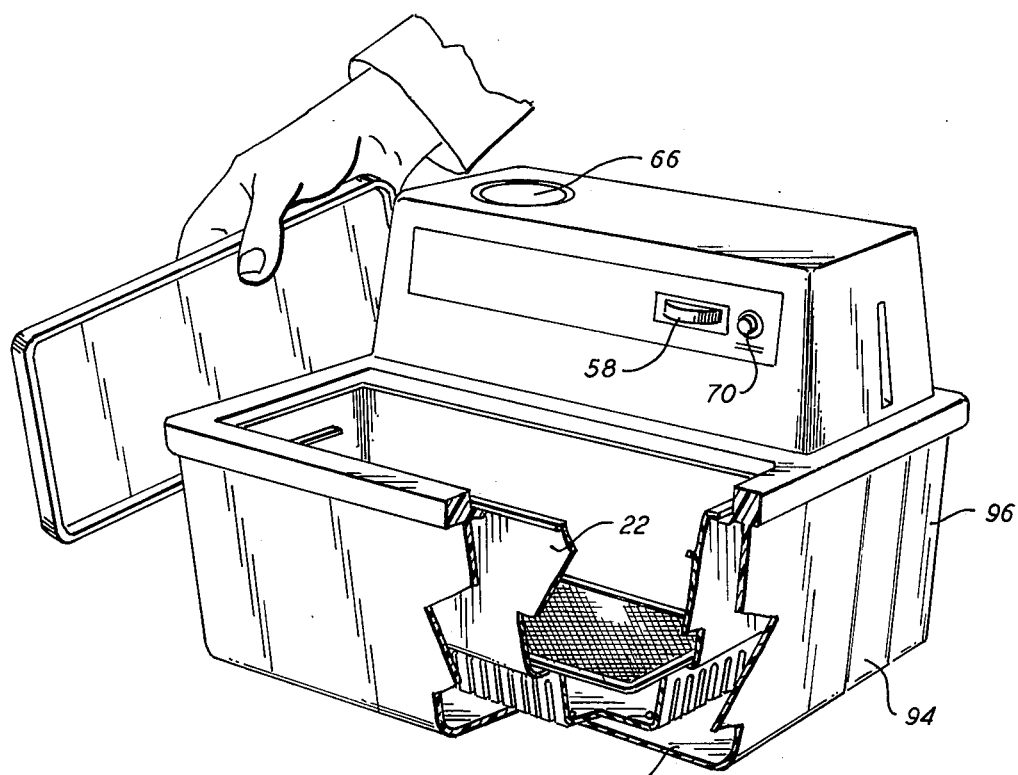
FIG. 1 is a perspective view of an automatic chlorinator embodying the present invention.
Figures 2, 2A:
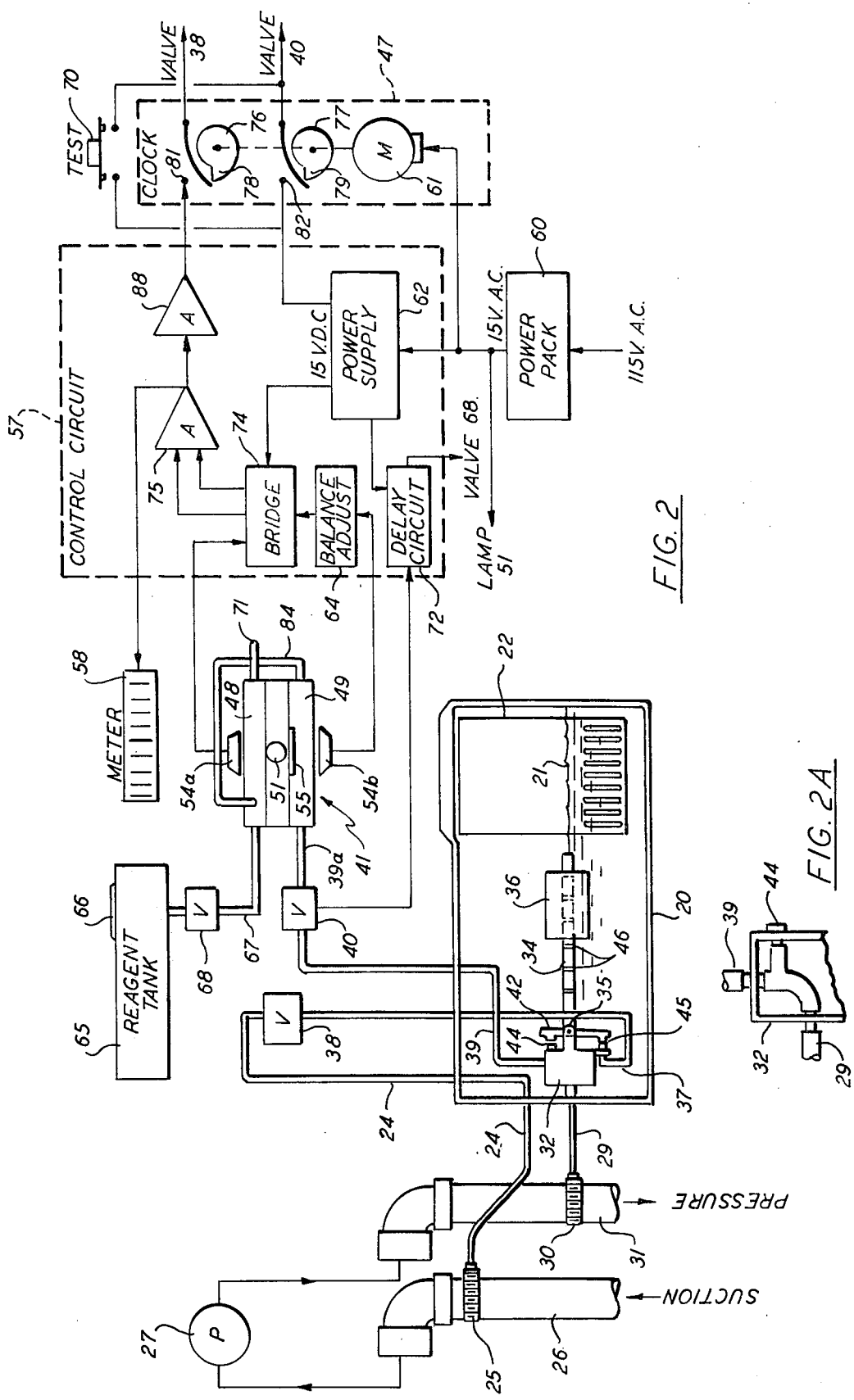
FIG. 2 is a schematic diagram of the automatic chlorinator showing the interrelation of the component parts.
FIG. 2A is an enlarged fragmentary view of the float valve housing with the cover removed to show internal connections.

Referring now to the drawings, and with particular reference to FIGS. 1 and 2, the reference number 20 indicates a reservoir for a chlorine saturated water solution 21, the reservoir having therein a removable, perforate container 22 in which dry chlorine in tablet or granular form is placed. Reservoir 20 is connected by a suitable flexible conduit 24 and conventional saddle tee 25 to a pipe 26 connected to the suction or low pressure side of a pump 27 forming a part of the water circulation system for the pool. The reservoir is also connected by a flexible conduit 29 and saddle tee 30 to a pipe 31 connected to the high pressure side of the pump. Normally, water will be drawn from a point adjacent the deep end of the pool (not shown) by pipe 26 and returned to a point or points at the shallow end of the pool by pipe 31, the water passing through suitable filter means (not shown) located on the high pressure side of the pump during this circulation.

Located in the reservoir 20 is a float valve assembly including a housing 32, an arm 34 pivotally connected at 35 to the housing and a float 36 carried by the arm. The housing 32 is connected to the conduit 29, to a conduit 37 connected through a solenoid valve 38 to the conduit 24, and to a conduit 39 connected through a solenoid valve 40 to a sample vial 41, to be described. With no water in the reservoir, the weight of the float 36 will cause a cross arm 42 fixed on the float valve arm 34 to open an upper port 44 in housing 32 and close a lower port 45, the latter communicating with conduit 37.

With the upper port 44 open and the pool pump 27 operating, pool water in pipe 31 will enter the reservoir 20 through conduit 29, the housing 32 and port 44.

Within the housing, conduit 29 connects with both the port and conduit 39 as shown in FIG. 2A where a portion of the housing is shown with its cover removed. As the water flows into the reservoir, it raises the float 36 until the cross arm 42 closes port 44 and opens port 45. Pool water cannot, however, be drawn out of the reservoir through the open port and conduits 37 and 24 because valve 38 is normally closed.

The amount of pool water that enters reservoir 20 through port 44 will depend on the position of float 36 longitudinally on arm 34, and the position of the float will in turn be determined by the capacity of the pool in gallons of water. To this end, the arm 34 may be marked with colored rings 46 for each 5000 gallons of pool capacity. For a pool with a capacity of 15,000 gallons, for example, the inner end of float 36 will be positioned on the third ring 46 as shown. When the entering water lifts the float enough to close port 44 and shut off the supply, the chlorine in container 22 will start to disolve in the water and this will continue until a saturated state is reached.

To test the residual chlorine in the pool water, it is drawn into the sample vial 41 at regular intervals under the control of a clock assembly 47 to be described. The sample vial is formed with a pair of spaced chambers 48,49 of identical configuration and volume. Chamber 48 is designated herein as the sample chamber and chamber 49 is designated the reference chamber.

Figure 4:
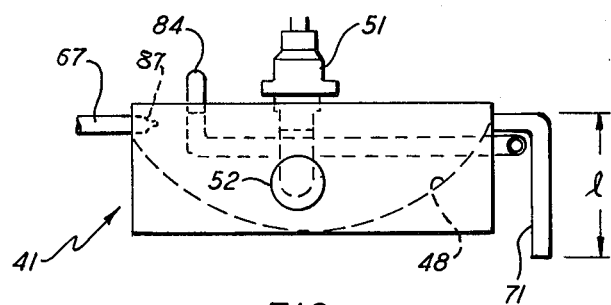
FIG. 4 is a diagrammatic side view of the sample chamber of the sample vial, the view being taken on line 4-4 of FIG. 5.
Figure 5:
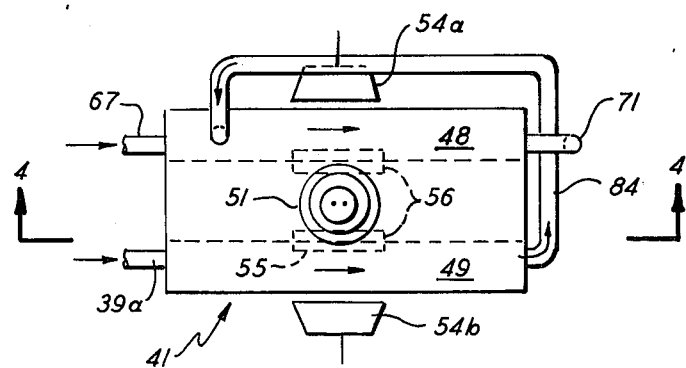
FIG. 5 is a diagrammatic top plan view of the sample vial.
Figure 6:
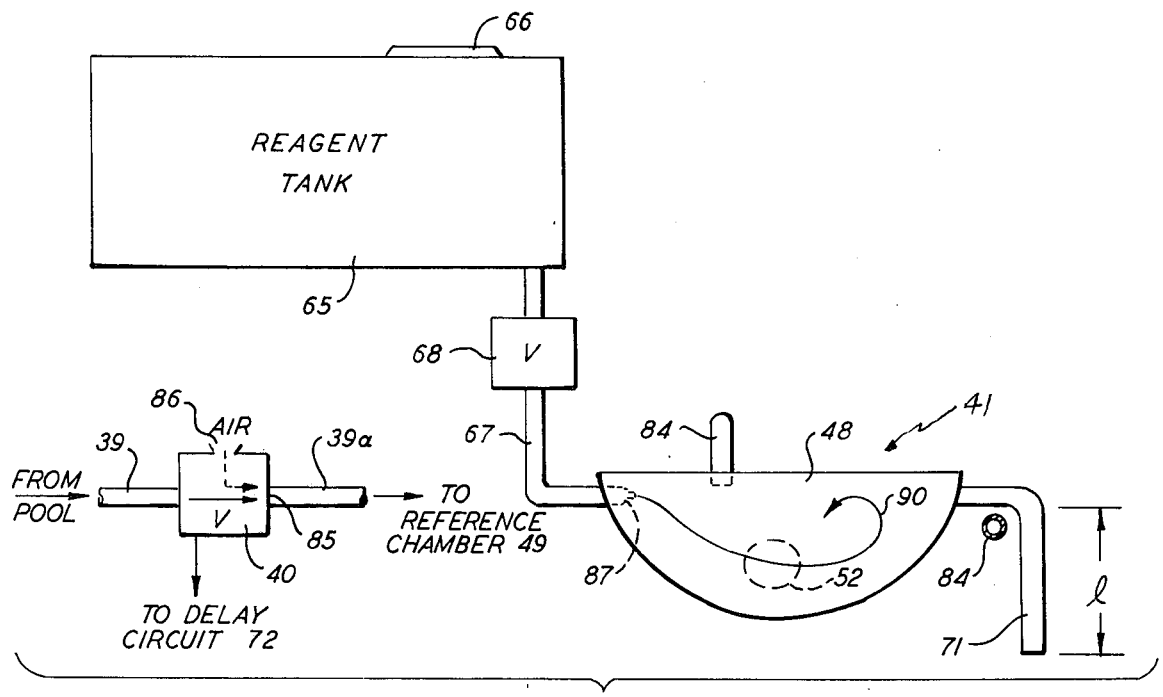
FIG. 6 is a schematic diagram showing the operation of the sample vial.

A miniature incandescent lamp 51 is positioned in the space between the chambers 48,49, and the side walls of the chambers are provided with aligned windows 52, FIGS. 4 and 6, opposite the lamp filament. A pair of photocells 54a and 54b are respectively aligned with the window in the outside wall of each chamber, and with this arrangement light rays from the lamp pass through the contents of the chambers and onto their respective photocells. A yellow spectral filter 55, FIG. 5, is positioned in reference chamber 49 in line with the light rays passing therethrough and a pair of blue spectral filters 56 are mounted in the sample vial on opposite sides of lamp 51 to enhance the detection sensitivity of the sample vial assembly.

When pool water is drawn into the chambers 48,49, a metered amount of a reagent such as orthotolodine is added to the water in sample chamber 48 in a manner to be described in more detail hereinafter. The reagent reacts with the residual chlorine in the water and causes the latter to change color, with the opacity of the color varying according to the amount of chlorine in the water. The fluid in sample chamber 48 thus operates as a spectral fluid filter through which the light rays pass on their way to the photocell 54a outside the chamber, and the vial as a whole functions as a colorimetric comparator.

The output signals of the photocells 54a,54b, are compared in a control circuit 57 to be described, and the control circuit coacts with the clock 47 to cause a measured amount of the chlorine saturated solution in reservoir 20 to be added to the pool if the control circuit determines that the level of the residual chlorine in the sample tested is less than a predetermined desired level. In making this comparison, the control circuit also signals a meter 58 which gives a direct reading of the residual chlorine level.

The electrical power for the automatic chlorinator is derived from a power pack 60 which is a step down transformer that converts 115 volt line voltage to 15 volt A.C. The 15 volt A.C. operates lamp 51 and the clock motor 61. It is also fed into a power supply unit 62 that converts it to 15 volt D.C.

OPERATION

Before connecting the automatic chlorinator to the circulating system for the pool, it is necessary to adjust a balance adjust circuit 64 in the control circuit 57 for a specific residual chlorine level. In practice, the adjustment is made for a residual chlorine level of 0.6 parts per million. This is done by first filling a reagent tank 65 with a reagent such as orthotolodine, the tank having a fill opening and cap 66 therefor, FIGS. 1 and 2. The tank 65 is connected by a conduit 67, in which there is a normally closed solenoid valve 68, to the sample chamber 48.

After filling the reagent tank, a chlorine water solution having the desired level of residual chlorine, e.g. 0.6 parts per million, is injected into the conduit 39 and the power pack 60 is plugged into an electrical outlet. A test switch 70 which bypasses the clock 47 is then depressed allowing power from the power supply 62 to energize valve 40. This causes the valve to open and the solution in conduit 39 flows into the sample and reference chambers 48,49 of the sample vial 41.

When the solution is observed draining from a drain line 71, FIGS. 2, 4 and 5, connected to the sample chamber 48, switch 70 is released causing the induction coil of valve 40 to produce a collapsing field that activates a delay circuit 72 within the control circuit 57. The delay circuit energizes valve 68 for a specific period of time which allows reagent to flow into the sample chamber 48. Light rays from lamp 51 pass through the solution in reference chamber 49 and the solution-reagent mixture in chamber 48 and onto their respective photocells 54b and 54a.

The photocell signals are received by the balance adjust circuit 64 and a bridge circuit 74 that is connected to it. The bridge circuit is connected through a differential amplifier 75 to the meter 58. By adjusting the balance adjust circuit, the meter is brought to a null or center point reading. In actual practice, this adjustment is made at the factory.

With the balance adjust circuit 64 adjusted so that meter 58 is nulled for the desired residual chlorine level of 0.6 parts per million, the position of float 36 is adjusted on arm 34 for the water capacity of the pool and then the chlorinator is connected to the pool circulating system by conduits and saddle tees as previously described. When the pool pump 27 is turned on, pool water enters the reservoir 20 through port 44 and lifts the float until port 44 closes and port 45 opens.

When the power pack 60 is plugged in, the lamp 51 turns on, the clock motor 61 starts operating and stepped down power is supplied to the power supply 62. The motor operates through a suitable gear train (not shown) to rotate a pair of wafers or cams 76 and 77 having lobes 78 and 79, respectively. In the preferred embodiment of the invention, cams 76 and 77 make one complete revolution each hour whereby their lobes 78 and 79 operate to respectively close switches 81,82 once each hour. Any other time interval for a complete revolution of the cams is possible. The length of time that the switches remain closed depends of course on the configuration of the cam lobes.

When cam 77 closes switch 82, 15 volt D.C. power is supplied to valve 40 energizing its coil and causing it to open. This permits pool water to flow into the sample vial 41 from pipe 31 on the high pressure side of the pump through conduit 29, housing 32 and conduit 39, FIGS. 2 and 2A. The water enters reference chamber 49 and fills it and then flows through a conduit 84 to the sample chamber 48 and fills it with the excess flowing out through the drain line 71. The switch 82 keeps valve 40 energized for about 30 seconds, see FIG. 3, after which the switch opens, the valve de-energizes and the flow stops.

Valve 40 is a two-way valve and when it de-energizes its outlet port 85, FIG. 6, becomes connected to an air vent 86 in the valve. This permits the pool water sample to rapidly drain from the portion 39a of conduit 39 that is between the valve and the sample vial, and also from drain line 71 leaving fixed and equal volumes of water in the chambers 48,49.

Figure 3:
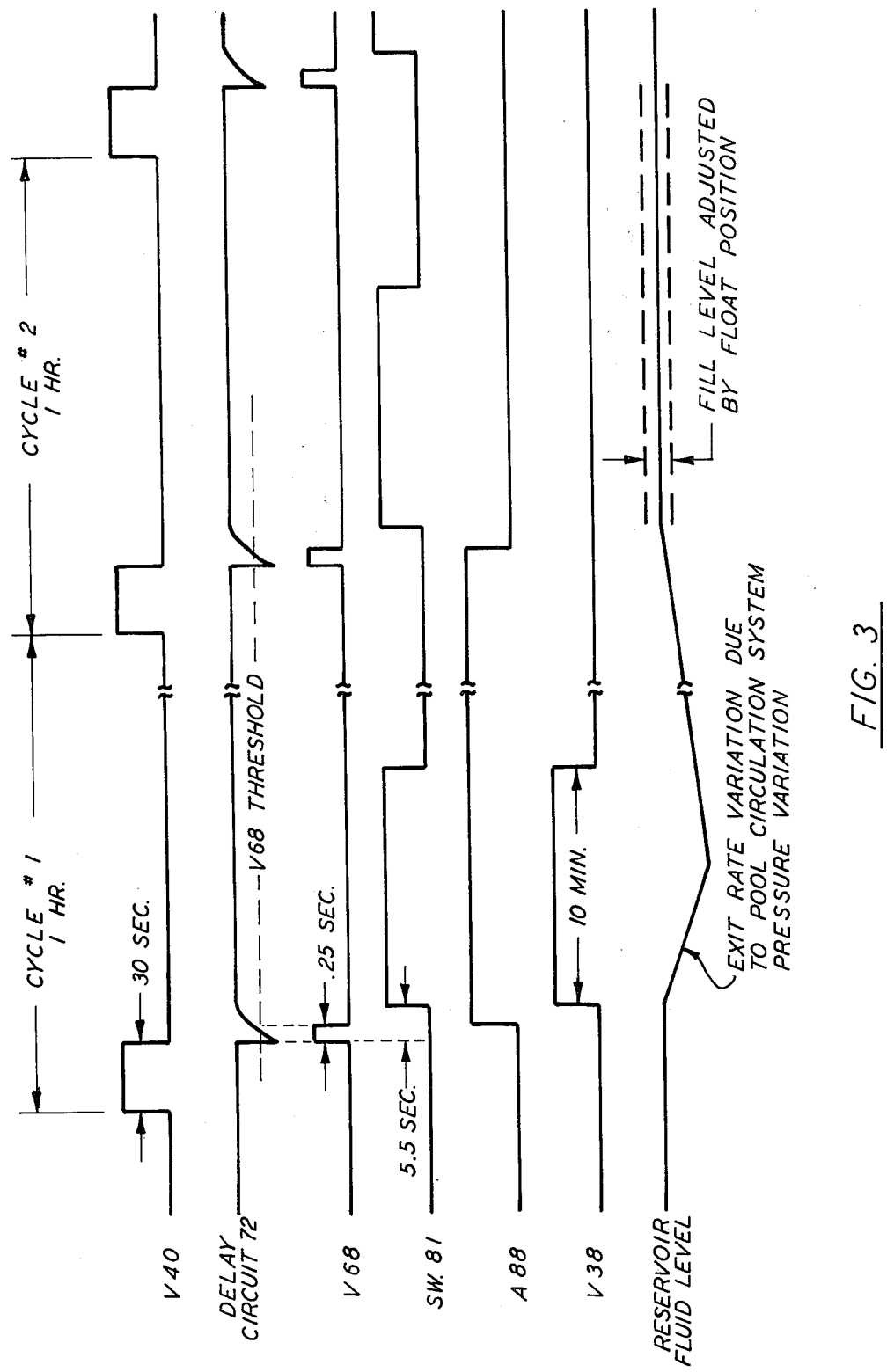
FIG. 3 is a typical timing diagram showing two cycles of operation of the automatic chlorinator.

At the instant valve 40 de-energizes, it activates the delay circuit 72 which in turn energizes valve 68 for a specific, short interval of time as is indicated in FIG. 3. This allows reagent to flow from tank 65 through conduit 67 into sample chamber 48, the conduit terminating within the chamber in a metering jet orifice 87, FIGS. 4 and 6. The amount of reagent permitted to enter the sample chamber is controlled by the time valve 68 is open and the size of the metering orifice, and is proportional to the size of the air vent 86 in valve 40 and the length of the drain line 71, FIGS. 4 and 6.

The rapid draining of the water from the sample vial when valve 40 de-energizes causes the reagent to quickly mix with the chlorinated pool water remaining in the sample chamber 48 and causes it to change color, with the opacity of the color varying according to the amount of residual chlorine in the water. The colored mixture thus becomes a spectral fluid filter for light rays passing from lamp 51 to the photocell 54a for the sample chamber. The amount of light transmitted by the fluid filter varies according to its opacity which, as already noted, depends upon the residual chlorine level of the sample.

Light rays from the same lamp 51 also pass through the colorless pool water sample (because no reagent has been added) in the reference chamber 49, and through the yellow spectral filter 55 associated with that chamber, to the photocell 54b. If the residual chlorine in the sample is less than the 0.6 p.p.m. for which the balance adjust circuit 64 was adjusted to bring the meter 58 to a null reading, the photocell 54a will supply a current to the bridge circuit 74 that is more than that set at the null while the current supplied to the bridge circuit by photocell 54b will remain the same. The bridge circuit in this situation supplies an imbalanced input to the differential amplifier 75.

Amplifier 75 provides a voltage at its output that is proportional to the input imbalance and either positive or negative depending on whether the current from photocell 54a is more or less than the null current. Amplifier 75 drives the meter 58, FIGS. 1 and 2, and the latter provides a direct reading of the residual chlorine level of the pool water. Amplifier 75 also drives a second amplifier 88 which, however, has an output signal only if the voltage at the output of amplifier 75 is positive meaning that the current from photocell 54a exceeds the null current, i.e. the residual chlorine in the sample is less than 0.6 p.p.m.

The clock cam 76 is set so that very shortly after valve 68 de-energizes the cam lobe 78 closes switch 81, see FIG. 3. If amplifier 88 is producing an output signal when this happens, valve 38 will be energized permitting the chlorine saturated solution 21 in reservoir 20 to be drawn into pipe 26 on the low pressure side of the pool pump through open port 45 and conduits 37 and 24. The cam lobe 78, which is shown only schematically in FIG. 2, is such that valve 38 remains energized for approximately 10 minutes, see FIG. 3, during which time around three quarts of the chlorine saturated solution 21 are drawn out of the reservoir and added to the pool water. In this connection, once amplifier 88 has been set by a positive output at amplifier 75, it continues to have an output signal until reset by a negative output at amplifier 75. When the level of the solution in the reservoir drops to the level of port 45, the float valve assembly operates to close the port and open port 44 whereby pool water again flows into the reservoir from pipe 31.

If the residual chlorine in the pool water sample drawn into the sample vial 41 is equal to or greater than 0.6 p.p.m., valve 38 is not energized even through switch 81 has been closed by the clock. Thus, if the sample has a residual chlorine level of 0.6 p.p.m., the current supplied by photocells 54a and 54b to the bridge circuit 74 will be the same as the current that was supplied in bringing meter 58 to a null reading and there will be no input from the bridge circuit to amplifier 75.

If the residual chlorine in the sample is greater than 0.6 p.p.m., the bridge circuit will supply an imbalanced input to amplifier 75 but, because the current from photocell 54a is less than the null current, the amplifier output voltage will be negative. In this situation, amplifier 88 is unable to provide an output signal and valve 38 is not energized. The timing diagram of FIG. 3 schematically illustrates two cycles of operation of the chlorinator; in the first cycle the residual chlorine in the sample tested is less than 0.6 p.p.m. and chlorine saturated solution is added to the pool water from the reservoir. In the cycle following, the level of the residual chlorine is equal to or greater than 0.6 p.p.m. and no chlorine solution is added to the pool water.

The test switch 70 can be depressed at any time to check the residual chlorine level on meter 58. As stated before, closing the switch by-passes clock 47 and causes valve 40 to be energized whether cam 77 is in switch closing position or not. This allows a sample of pool water to be tested in the sample vial 41 and any current from photocell 54a that differs from the null current will result in an input signal from the bridge circuit to amplifier 75 which in turn signals the meter. If the test switch is not depressed for several hours, the meter reading does not change during a cycle. As will be apparent, depressing the test switch may indicate on the meter that the residual chlorine level of the pool water is too low, but chlorine solution will not be added to the pool water from reservoir 20 until the next closing of switch 81 by clock cam 76.

THE SAMPLE VIAL

The sample vial 41, FIGS. 2 and 4-6, has two discrete chambers, sample chamber 48 and reference chamber 49, that are identical as to configuration and volume. The chambers are spaced apart as shown in FIG. 5 with the space between them being occupied by a tungsten lamp 51 that provides broad band light. As previously described, the rays from lamp 51 pass through aligned windows 52 in the side walls of the chambers, through the contents of the chambers and associated filters 55, 56, and then are received by photocells 54a and 554b which are a matched pair.

As indicated in FIGS. 4 and 6, the bottom walls of the chambers 48, 49 are substantially semi-cylindrical for good mixing and to facilitate flushing the chambers out. The inlet and outlet ports for the chambers are located near the tops of the chambers and none are below a certain level which is the same for both chambers. Thus, the conduits 39a, 84, 67 and 71, FIG. 5, are all connected to the chambers 48, 49 at the same level while the connecting conduit 84 terminates in chamber 48 at a point above the level. From its point of connection to chamber 49, conduit 84 bends downwardly to pass beneath drain line 71 and then bends upwardly to enter the top of chamber 48 as indicated in FIGS. 4 and 5.

To make automatic colorimetric comparisons of solutions with consistent accuracy as contemplated by the invention, it is necessary to control the volume of the samples, to control the amount of reagent added, and to mix the reagent with its sample thoroughly.

When valve 40 becomes energized, pool water flows through it and enters reference chamber 49 through conduit 39a, FIG. 5. The water fills the chamber and then flows through conduit 84 to the sample chamber 48 and fills it up to the level of drain line 71 at which point the water begins to drain out through the line, FIGS. 4-6. Once the sample chamber is filled, a steady state is reached and the water drains at a constant velocity thereby causing positive pressure in the chamber. In normal operation, when valve 40 is energized in each cycle there will already be pool water in the chambers 48, 49 left from the previous cycle and the water first entering in the new cycle operates to completely flush out the previous cycle water. The approximately thirty seconds that valve 40 remains energized, FIGS. 3 and 7, insures that all of the old sample water will be flushed out and the chambers filled with new sample water.

When valve 40 de-energizes, the path through it is altered. Pool water stops entering the valve through conduit 39 and a new path is established that connects air vent 86 with outlet conduit 39a, FIG. 6. It is necessary to inject the reagent immediately after valve 40 de-energizes and this is effected by the delay circuit 72 which energizes valve 68 for a specific period of time as will be explained in more detail hereinafter.

Figure 7:
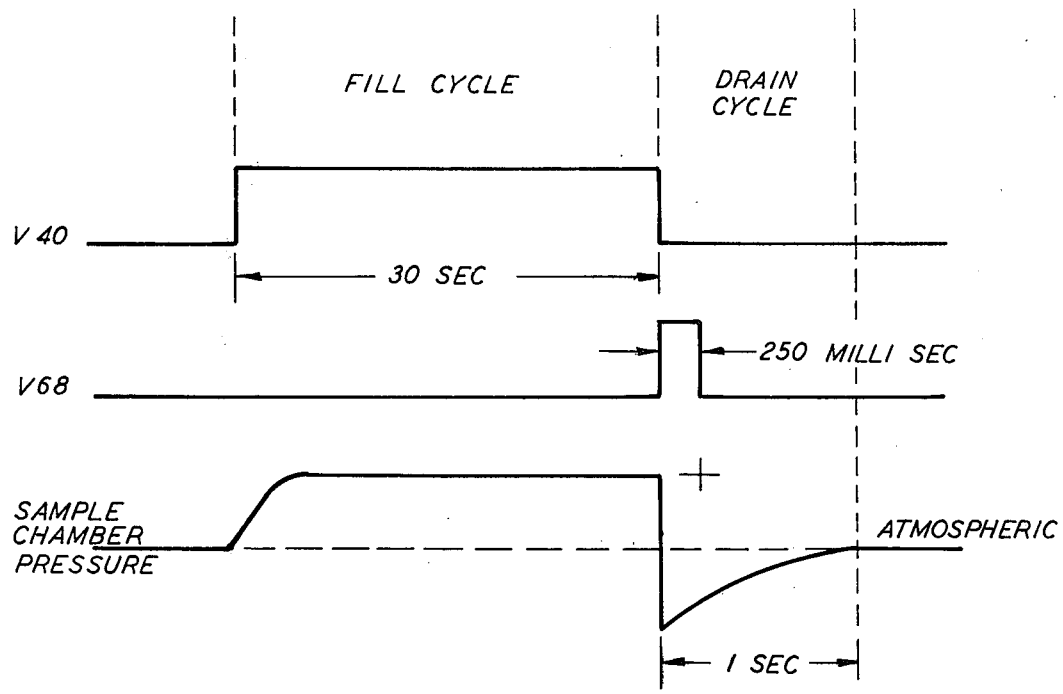
FIG. 7 is a typical timing diagram showing the operation of the sample vial.

At the start of the drain cycle of the sample vial 41, FIG. 7, conduits 39a, 84 and 71 and chambers 48 and 49 will all be filled with pool water, FIGS. 5 and 6. As previously noted, there is also a positive pressure in sample chamber 48. Upon the de-energization of valve 40 and substantially immediate energization of valve 68, air entering vent 86 causes water to rapidly drain from conduits 39a, 84 and 71, and simultaneously reagent enters the sample chamber through conduit 67 and metering orifice 87, FIG. 6. The pressure in chamber 48 decreases rapidly, FIG. 7, due to the vertical head in the drain line or conduit 71. In fact, the pressure actually drops below atmospheric for a short period of time.

The amount of reagent added to the sample chamber is controlled in time by valve 68 but is proportional to the ratio of the diameter of air vent 86 to the metering orifice 87. The amount of reagent added is also a function of the pressure differential caused by the length (l) of the vertical head of drain line 71, FIGS. 4 and 6. In actual practice, the interval of time that valve 68 is energized, the length of drain line 71 and the aperture diameter ratio have been calculated to add the equivalent of three drops of reagent to the sample chamber 48.

As already noted, it is necessary to thoroughly mix the reagent with the pool water in the sample chamber so that an accurate colorimetric comparison can be made. This is accomplished by shaping the bottom of the chamber so as to create circular turbulence as indicated by arrow 90 in FIG. 6, by insuring that the flow velocity during the drain cycle is sufficient to cause turbulence and to allow a sufficient flow period to occur. The velocity of flow is a function of the diameter of air vent 86 and the length (l) of the vertical head of drain line 71, and the flow period is directly proportional to the length of conduit 39a between valve 40 and reference chamber 49.

The design of the sample vial 41 inherently insures that there will be the same volume of pool water in each chamber. Draining from each chamber simply stops when the level of the water in it reaches the low point of its outlet port.

Figure 8:
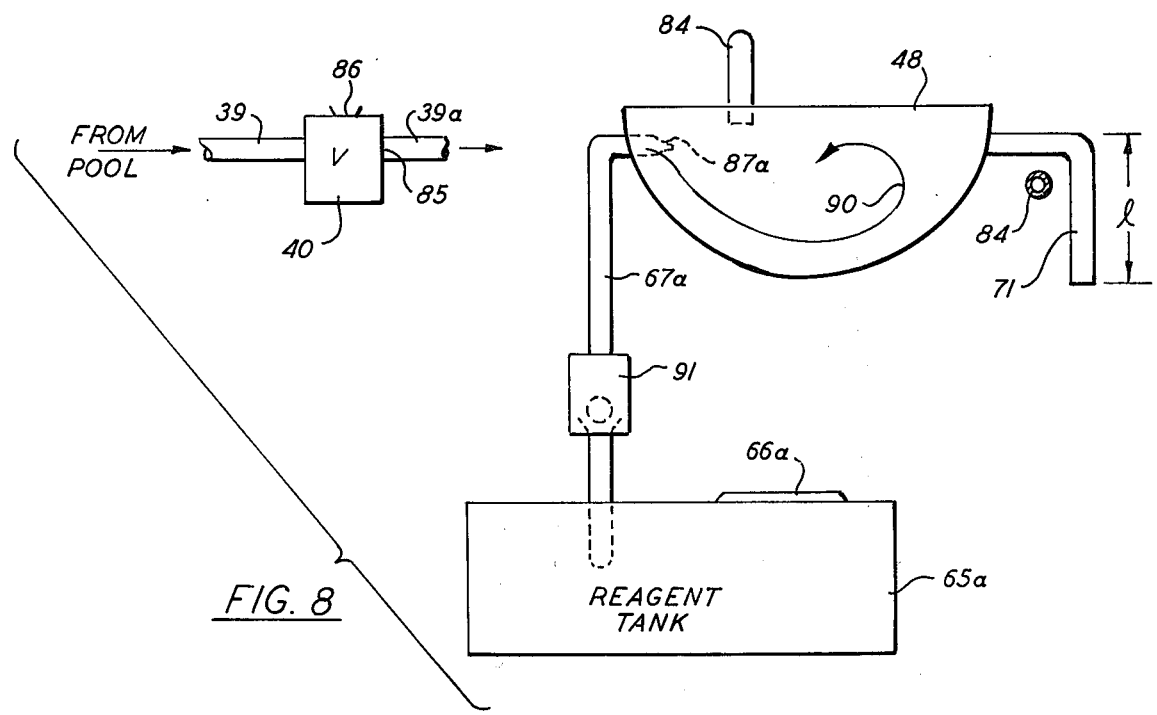
FIGS. 8 and 9 are diagrams respectively corresponding to FIGS. 6 and 7 showing an alternative reagent adding arrangement.
Figure 9:
Figure 9:
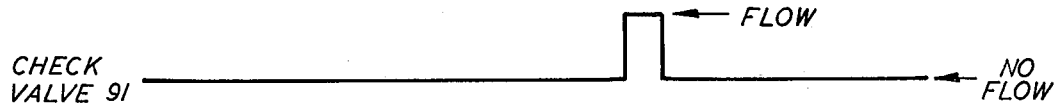
Figure 9:
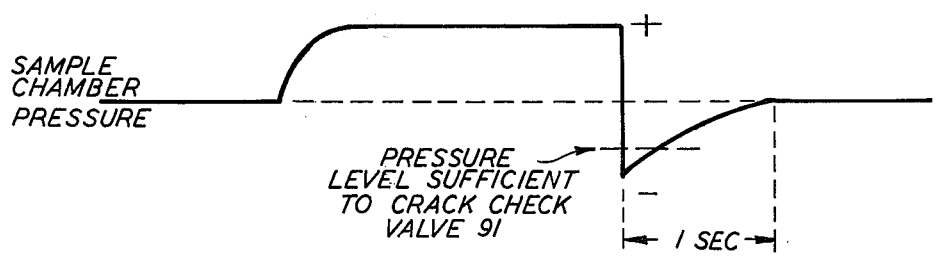

FIG. 8 illustrates an alternative means for adding reagent to the sample chamber 48 of the sample vial, and FIG. 9 is a timing diagram therefor. Except for the reagent adding means, the sample vial, its associated components and method of operation are the same as just described. In the FIG. 8 modification, a check valve 91 controls the reagent feed rather than the solenoid valve 68. The valve 91 is in a conduit 67a extending from the reagent tank 65a to the sample chamber 48, the tank in this instance being positioned below rather than above the sample vial.

In the check valve modification, the sample vial chambers 48, 49 are filled as described above and at the start of the drain cycle conduits 39a, 84 and 71 and chambers 48 and 49 are filled with pool water. At the same time, the conduit 67a is filled with reagent above and below the valve 91. Conduit 67a is initially filled with reagent by applying a pumping action to the reagent tank cap 66a which is flexible. The check valve prevents downward flow and therefore the conduit remains filled.

As in the modification of FIGS. 6 and 7, when valve 40 de-energizes air enters the vent 86 in the valve and causes water to rapidly drain from conduits 39a, 84 and 71. This causes the pressure in chamber 48 to decrease rapidly, see FIG. 9, due to the vertical head in drain line 71, the pressure dropping below atmospheric as indicated. The period of time during which reagent flows into sample chamber 48 in the check valve modification is controlled by the length of time that the pressure in the sample chamber is sufficiently below atmospheric to overcome the cracking pressure of the check valve 91. This being the case, the delay circuit 72, which controls the time that valve 68 is energized, can be omitted in this modification.

THE DRAIN TUB

Figure 10:
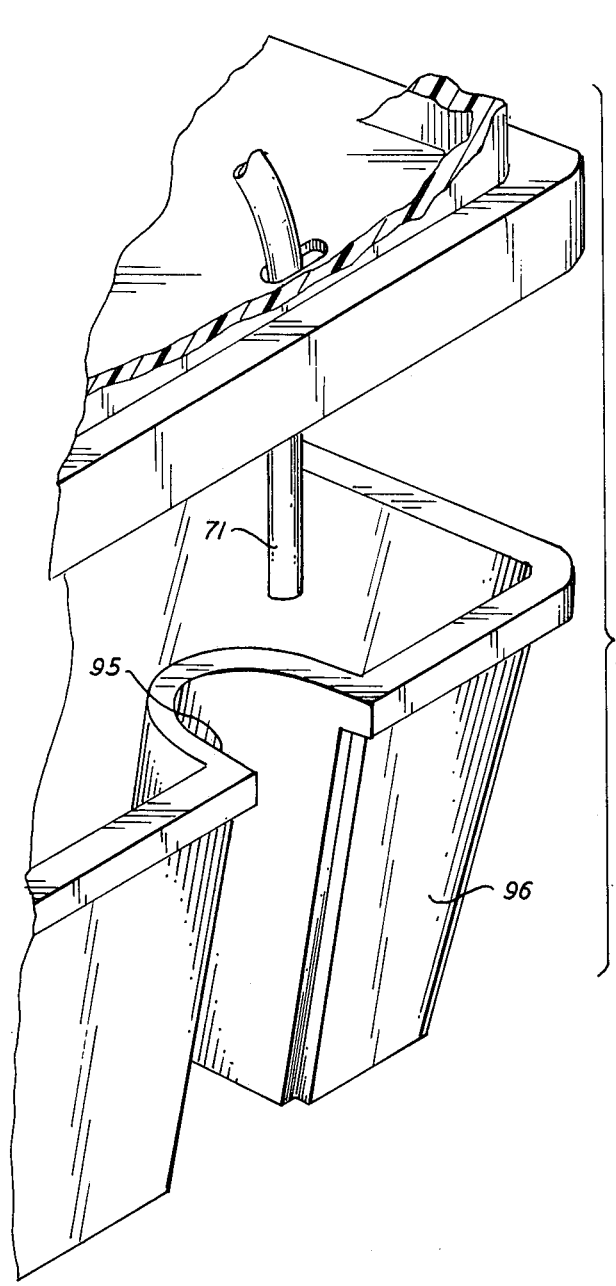
FIGS. 10 and 11 are enlarged perspective views showing the sample vial drain arrangement.
Figure 12:
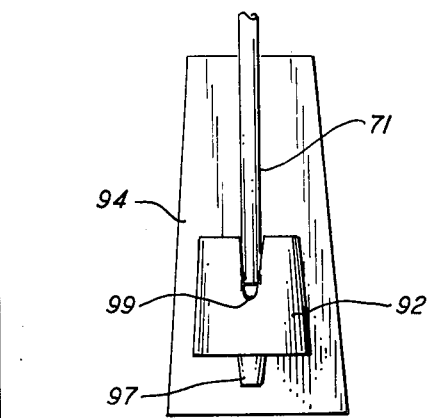
FIG. 12 is an elevation showing the inside of the removable drain tub panel.
Figure 11:
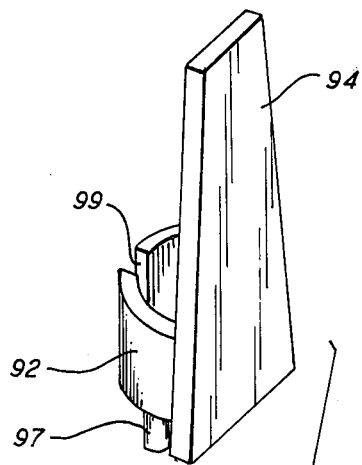
Figure 11:
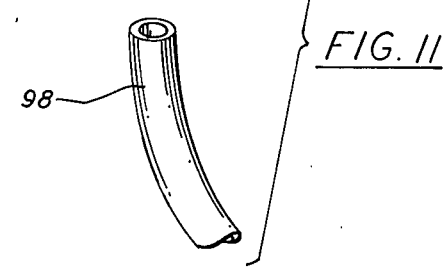

To insure that the automatic chlorinator is not affected by its outside environment, a drain tub 92, FIGS. 11 and 12, is provided. This tub is arranged to receive the drain line 71 from sample vial 41, and its purpose is to isolate the drain line so that it cannot be tampered with and to insure that it cannot become clogged. The tub 92 is mounted as shown on a panel 94, and the tub and panel are removably secured in a recess 95 in the chlorinator housing 96, FIG. 10. The relationship between the tub and drain line 71 is such that the latter extends less than half way down into the tub as shown in FIG. 12 when the panel 94 is mounted in the housing.

As described above, the length (1) of the vertical head of the drain line, FIGS. 4, 6 and 8, is an important factor in the fluid force that draws the reagent into the sample vial. This force must, of course, be constant to insure that the same amount of reagent enters the chamber during each cycle of operation, and therefore the drain line must be able to drain freely at all times. To this end, the volume of the tub 92 below the lower end of the drain line and the diameter of the pot 97 to which a drain tube extension 98 is attached are such that complete drainage occurs during each cycle of operation without the level of the liquid in the tub rising to a point where it would impede the flow from drain line 71.

The drain extension 98 can be led to any location convenient for the disposal of the drained liquid. Should this extension itself become clogged or kinked, liquid still cannot rise in the tub 92 to a point where it would impede the flow from the drain line 71 because the tub wall is formed with an overflow notch 99, FIG. 12, the bottom of which is below the end of the drain line.

The Delay Circuit

Figure 14:
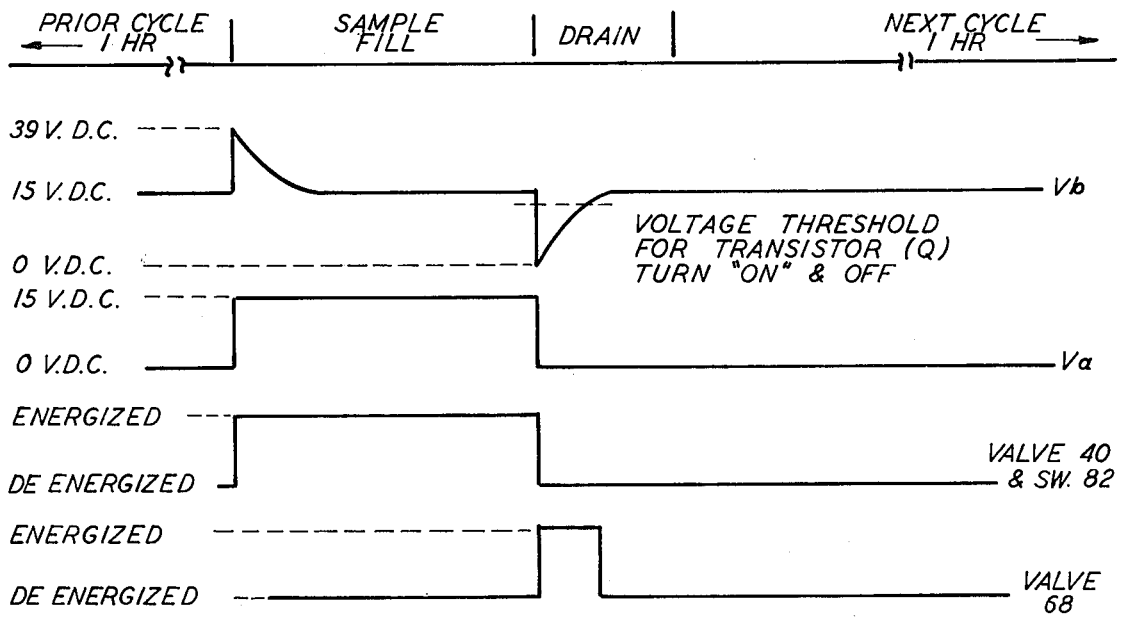
FIG. 14 is a typical timing diagram showing the operation of the delay circuit.
Figure 13:
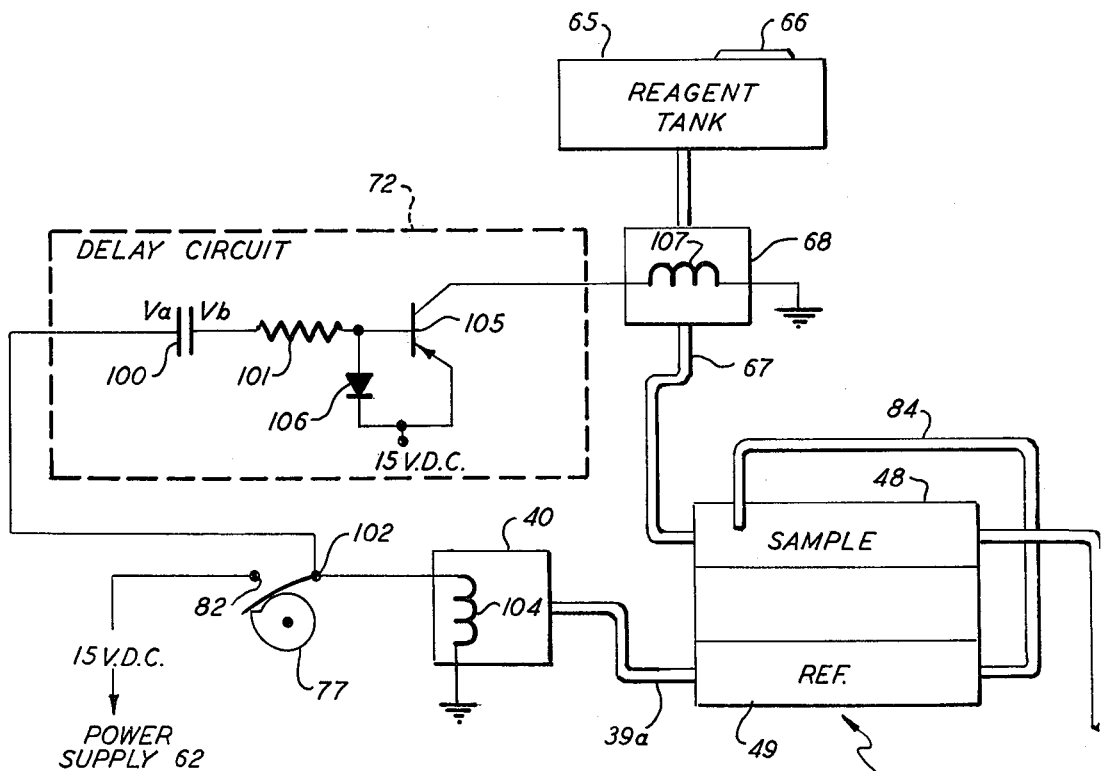
FIG. 13 is a schematic diagram showing the relationship between the delay circuit and the operation of the sample vial.

FIG. 13 illustrates the details of the delay circuit 72 that is employed with the solenoid valve controlled reagent feed of FIGS. 2, 6 and 7. This Figure also shows the interrelation of the circuit and valves 40 and 68. FIG. 14 is a timing diagram for the delay circuit. As noted above, the function of the delay circuit is to control the time that valve 68 is energized and hence the time that reagent is allowed to flow through it to the sample vial 41.

The delay circuit 72 comprises a series connected capacitor 100 and resistor 101, the other side of the capacitor being connected at 102 to the induction coil 104 of valve 40 and to switch 82. The other side of resistor 101 is connected to the base of transistor 105 and to one side of a diode 106. The cathode side of the diode is connected to the emitter of transistor 105, and both the cathode and emitter are connected to the 15 volt D.C. power supply. The collector of the transistor is connected to the induction coil 107 of valve 68.

In operation, when switch 82 is not closed by the clock controlled cam 77, the voltage Va on one side of capacitor 100 is zero and the voltage Vb on the other side is 15 volts. When the cam 77 closes the switch, 15 volts from the chlorinator power supply 62 is applied to valve 40 and energizes it causing pool water to flow into the sample vial 41 as described above. This starts the sample fill period. The closing of switch 82 also causes voltage to be applied to capacitor 100 changing Va to 15 volts. However, since it is not possible to instantaneously change the voltage across a capacitor, this causes Vb to become 30 volts maintaining the 15 volt differential across the capacitor.

As soon as switch 82 closes, capacitor 100 begins discharging through a path through resistor 101, diode 106 and switch 82. The discharge continues until Vb reaches 15 volts meaning that the voltage across the capacitor is zero. This happens rapidly compared to the time that cam 77 keeps switch 82 closed. However, as cam 77 continues to rotate, the switch opens causing valve 40 to de-energize and the fill period for sample vial 41 to terminate.

As previously described, it is important for good mixing to introduce reagent into the sample chamber 48 at the instant the drain cycle starts in order to take advantage of the fluid turbulence that occurs in the sample vial at that time. When switch 82 opens, Va returns almost instantaneously to zero voltage due to current draining through the low inductance of coil 104. Since, during the sample fill period, the voltage across capacitor 100 dropped to zero when the capacitor discharged, i.e. 15 volts on each side, this condition must continue to exist instantaneously and as a result Vb also drops to 0 volts.

When Vb drops to zero volts, it back biases diode 106 and causes base current to flow in transistor 105. This turns the transistor "ON" and energizes valve 68 whereupon reagent flows into the sample chamber 48 of the sample vial. The transistor base current continues to flow in a path through the transistor, resistor 101, capacitor 100 and coil 104 and this causes Vb to approach 15 volts once again. The capacitor continues to charge until diode 106 becomes forward biased and transistor 105 turns "OFF" de-energizing vlave 68. The circuit thus returns to its quiescent state ready for another cycle to be initiated with the closing of switch 82 by clock controlleld cam 77.

In practice, it has been found that valve 68 need be energized for only 250 milliseconds to cause the desired amount of three drops of reagent to be added to the sample vial. This time period is controlled by the values of capacitor 100 and resistor 101.

From the foregoing description it will be apparent that the invention disclosed herein provides a novel and very advantageous automatic chlorinator for a swimming pool having a water circulating system. As will be understood by those familiar with the art, the invention may be embodied in other specific forms without departing from the spirit or essential characteristics thereof.

I claim:

1. An automatic chlorinator for a swimming pool having a water circulating system including a pump comprising, in combination, a reservoir for storing a chlorine saturated water solution, a dual chambered sample vial having a light source therein, conduit means operably connecting the high pressure side of the pump with the sample vial for introducing pool water into both chambers thereof, means for introducing a metered amount of reagent into one only of the chambers for mixing with the pool water therein, said means for introducing a metered amount of reagent including a reservoir for the reagent, conduit means connecting said reservoir with said one sample vial chamber, and a solenoid valve is said conduit means, a spectral filter for the other of said chambers, a photocell for each chamber, the light source operating to direct light rays onto the photocell for each chamber after passing through its contents and said filter, a clock assembly, normally closed valve means in the conduit means connecting the pump with the sample vial, the clock assembly being operable at regular intervals to open the valve means whereby pool water is introduced into the sample vial chambers, means controlled by the valve means for actuating the reagent introducing means, said means for actuating the reagent introducing means including a delay circuit forming a part of the control circuit, said delay circuit operating to energize the solenoid valve that forms a part of the reagent introducing means when the valve means tha permits pool water to be introduced into the sample vial chambers de-energizes, the delay circuit including a series connected capacitor and resistor for controlling the time interval that the reagent solenoid valve remains energized, a control circuit for comparing the output signals of the photocells to determine whether the residual chlorine in the pool water is or is not below a predetermined desired level, the control circuit including means for providing an output signal if the residual chlorine is below the predetermined desired level, conduit means operably connecting the reservoir to the low pressure side of the pump, and normally closed valve means in the last-named conduit means openable by said last-named output signal to permit chlorine saturated solution to flow from the reservoir to the pool.

2. An automatic chlorinator as defined in claim 1 wherein the reservoir having the chlorine saturated solution includes a float valve assembly having conduit connections with the high pressure and low pressure sides of the pump, the connection with the high pressure side being open and the connection with the low pressure side being closed when the level of the liquid in the reservoir is lower than a predetermined height, the high pressure connection closing and the low pressure connection opening when the level of the liquid reaches the predetermined height, said means for feeding a measured amount of chlorine saturated solution to the pool includes a solenoid valve in the float valve assembly connection with the low pressure side of the pump, said means for introducing pool water into the chambers of the sample vial including a conduit connection between the float valve assembly and the chambers.

3. An automatic chlorinator as defined in claim 1 wherein said sample vial having a pair of spaced apart discrete chambers, each chamber having an inlet and an outlet port for receiving and discharging pool water samples, the outlet ports for the chambers being at the same level, means forming a part of each chamber for stimulating turbulence in the pool water entering the chamber, said light source being positioned in the sample vial in the space between the chambers, window means for each chamber for permitting light rays from the light source to pass through the contents of the chamber, and means for introducing a metered amount of reagent into one only of the chambers for mixing with the pool water therein.

4. An automatic chlorinator as defined in claim 3 wherein the output port for the chamber receiving the reagent includes a vertical head portion having a precise predetermined length.

5. An automatic chlorinator as defined in claim 4 together with a receptacle forming a part of the chlorinator, the receptacle having a bottom drain; the vertical head portion of said chamber outlet port having its lower end extending partially into the receptacle, the receptacle and its drain being dimensioned to receive pool water draining from the outlet port without impeding its flow.

* * * * *

UNITED STATES PATENT AND TRADEMARK OFFICE
CERTIFICATE OF CORRECTION

PATENT NO. : 4,056,470
DATED : November 1, 1977
INVENTOR(S) : ANTHONY P. CARPENTIER It is certified that error appears in the above-identified patent and that said Letters Patent are hereby corrected as shown below:

Please correct the spelling of the inventor's last name to read -- CARPENTIER --.

Col. 9, line 9, "pot 97" should be -- port 97 --;

Col. 12, claim 4, line 16, "output" should be -- outlet --.

Signed and Sealed this

Fourth Day of April 1978

[SEAL]

Attest:

RUTH C. MASON
Attesting Officer

LUTRELLE F. PARKER
Acting Commissioner of Patents and Trademarks